M. ROTTER.
COMBUSTION ENGINE POWER PLANT.
APPLICATION FILED AUG. 10, 1916.

1,317,395.

Patented Sept. 30, 1919.
2 SHEETS—SHEET 2.

Inventor
Max Rotter
By
Attorney

UNITED STATES PATENT OFFICE.

MAX ROTTER, OF ST. LOUIS, MISSOURI, ASSIGNOR TO BUSCH-SULZER BROS.-DIESEL ENGINE COMPANY, OF ST. LOUIS, MISSOURI, A CORPORATION OF MISSOURI.

COMBUSTION-ENGINE POWER PLANT.

1,317,395. Specification of Letters Patent. Patented Sept. 30, 1919.

Application filed August 10, 1916. Serial No. 114,114.

*To all whom it may concern:*

Be it known that I, MAX ROTTER, a citizen of the United States, residing in St. Louis, Mo., have invented the following described Improvements in Combustion-Engine Power Plants.

The invention relates to multi-cylinder combustion-engine power-plants for marine vessels and particularly submarine vessels and consists in the organization of the engine frame work and associated parts of the equipment whereby the crank shaft and other large members internal to the frame work, may be conveniently and quickly removed when necessary without removal of the cylinders or their overhead construction. Broken crank shafts are not uncommon occurrences, and the ability to remove and replace them without completely dismantling the engines not only constitutes a substantial saving of expense but also a saving of time which, to naval vessels, is of special importance. Small sized engines have been heretofore proposed with frames sufficiently heavy to permit removal of sections thereof so as to allow lateral withdrawal of the crank shaft, the remaining or main part of the frame serving to support the cylinders during the removal process, but in large size combustion marine engines where the engine frames are no heavier than necessary to withstand the stress of normal use, and in that capacity serve principally as tension members, the removal of part of the frame work to permit lateral crank shaft withdrawal, leaves the remainder in danger of collapse from the abnormal strain and such methods of withdrawal are therefore not attempted. According to the present invention the power plant is so organized with relation to the engine frame work and the vessel frame work that the support of the cylinder and overhead constructions can be temporarily shifted partially to the vessel frame work while the front sections of the engine frame are removed and the crank shaft withdrawn through the opening provided.

A specific embodiment of the invention is shown in the accompanying drawings wherein—

Figure 1:
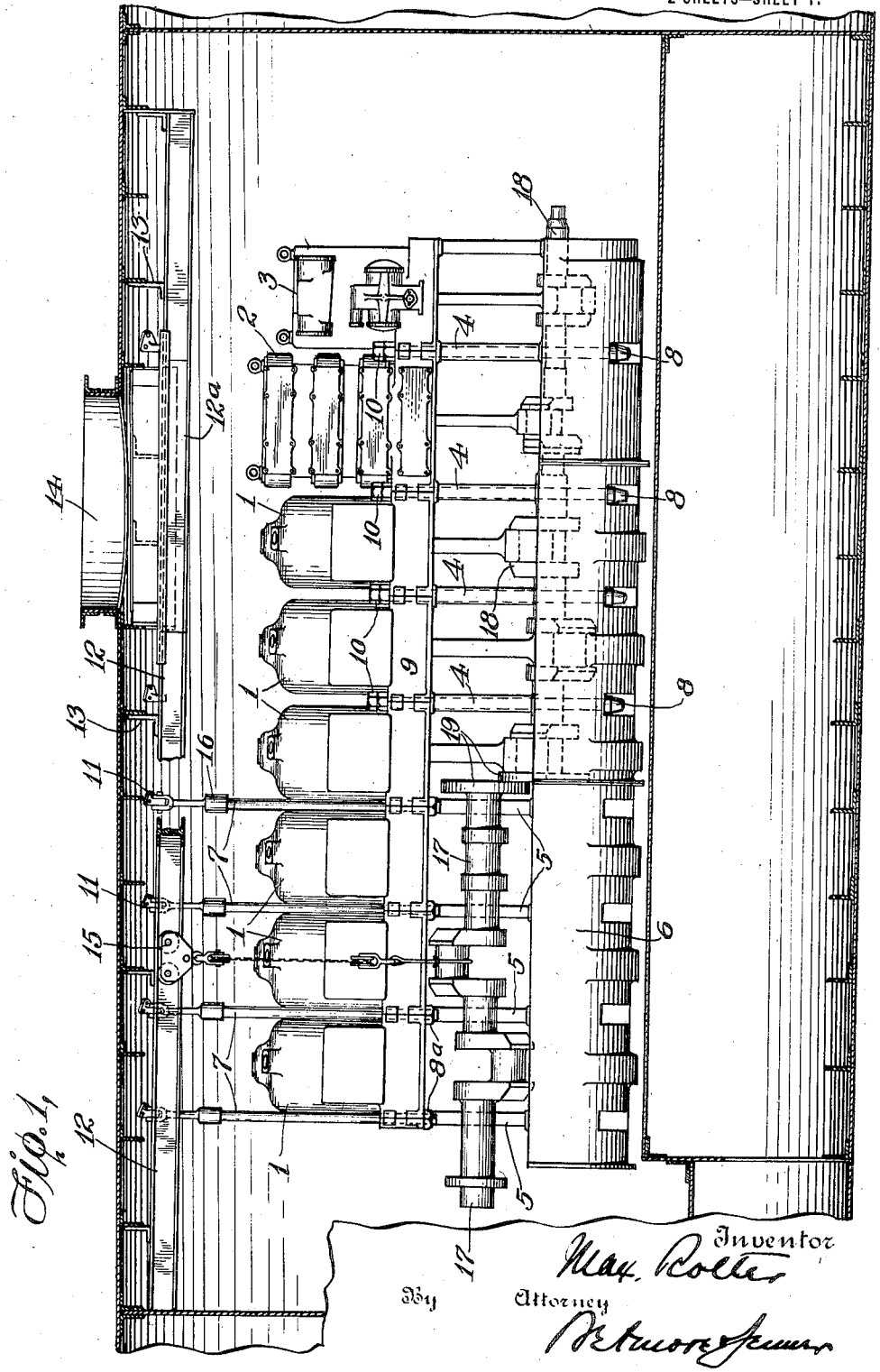
Figure 2:
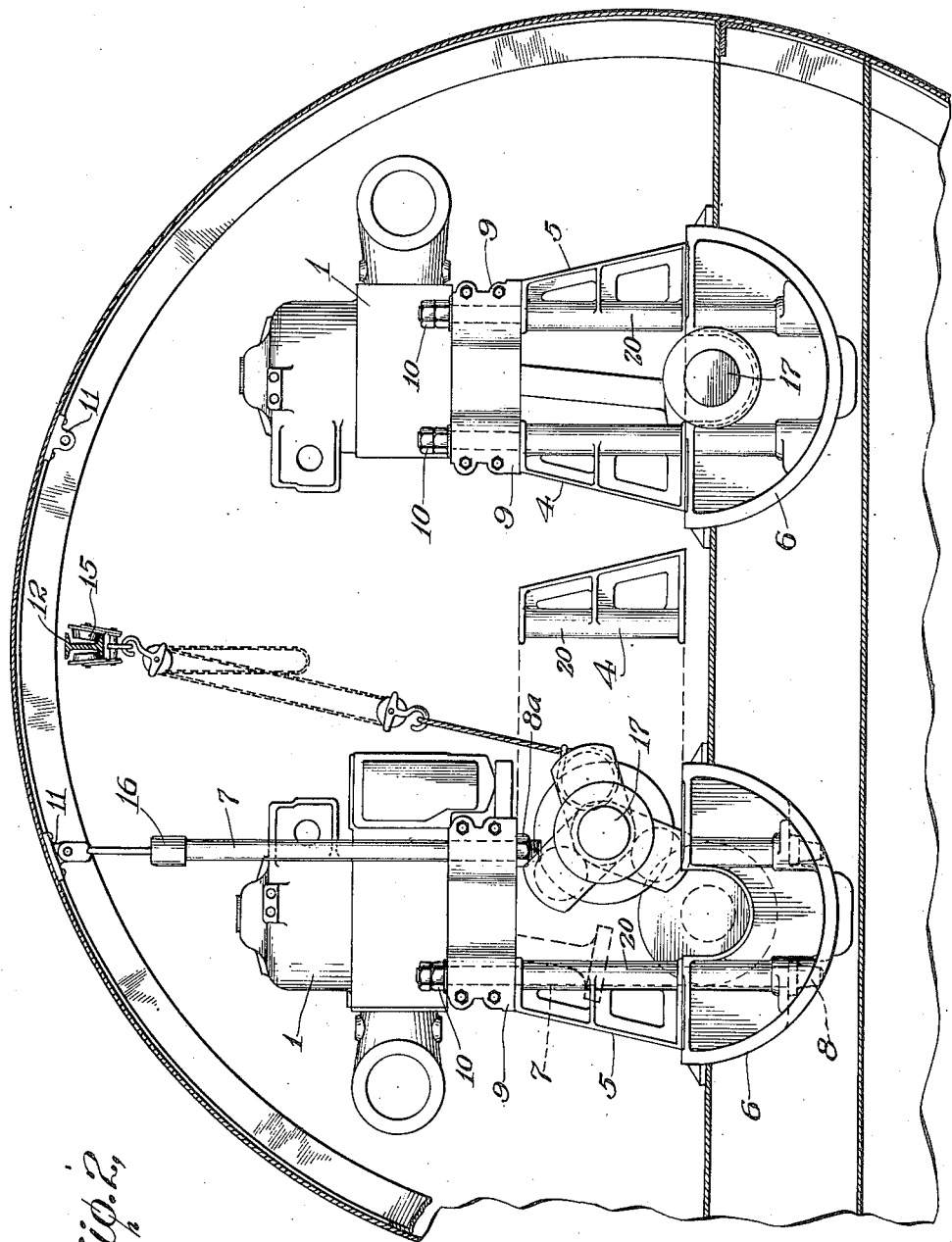

Figure 1 is a central, longitudinal, vertical section of a part of a submarine vessel, more specifically, the engine room, and Fig. 2 is a cross section showing the port and starboard engines in outline and in end elevation.

The combustion engines will be understood to be installed on the cross framing of the vessel for direct or indirect driving connection between their respective crank shafts and the two propeller shafts, the latter being ordinarily disposed a short distance below, and at equal distances on either side of, the central axis of the vessel. In these positions the overhead valve-gearing and the various pipe connections, operating levers, etc., not shown in the drawings become situate close to the curved roof part of the vessel and the rear sides of the engines are close to the side walls of the vessel as appears from Fig. 2, while the space between the two engines constitutes a gangway for the engineer. The engine cylinders 1 and also the air compressor 2 and oil and water pumps 3 are all similarily supported on a series of front and rear spacing sections 4 and 5 which rest upon and are arranged along the engine bed in transverse planes intervening between the successive cylinders. The front spacer sections 4 are those proximate to the central gangway and the rear sections are proximate to the walls of the vessel, and each pair consisting of a front and rear section serves normally to support one half the weight of each of the two cylinders which are immediately adjacent to it. Both are or may be exactly alike in shape and size and the front sections 4 are so formed as to be capable of insertion into or withdrawal from their normal positions by a straight lateral movement, that is to say they are devoid of the usual gibs or projections commonly used for interlocking similar frame sections together and therefore may be withdrawn in the manner stated whenever their securing means,—the tie-rods 7—have been removed and the pressure of the cylinders has been relieved. Each spacer section has tubular portions 20 or is otherwise shaped to contain, or be secured against displacement by, a tie-rod 7 which binds the cylinders upon the spacers and the latter to the bed. These rods are secured in sockets in the bed by their nuts 8 and in sockets provided in or between the cylinder lugs 9 by their nuts 10, and it will be observed that when the nuts are tightened the combined rods and spacers provide a practically integral and rigid frame structure which, though of relatively light weight, is specially suited for withstanding the tension put upon it by the thrust of the engine pistons. By removing the lower nuts 8 from the tie-rods the latter may be pulled upwardly through and out of the spacer sections and thereby the latter are released and may be withdrawn as above explained and when so withdrawn a clear opening will be available through which to remove the crank-shaft. Directly above the cylinder lug 9, the roof portion of the vessel is equipped with a row of strong lugs 11 securely bolted to the hull and between the rows of roof lugs over each engine there is provided a trolley rail 12 extending fore and aft and firmly supported at intervals along the length of the engine from the hangers 13. A section of this rail marked 12ª which is just below the hatch opening 14, is removable so that it will not obstruct the passage through the hatch when the latter is open and the connection or joint between the permanent and removable portions is made so that the trolley 15 may ride freely from one end of the track to the other. The trolley carries a chain hoist or equivalent lifting device and being in the center of the vessel and directly over the intermediate gangway between the engines, it may serve to lift the parts of either of them as occasion demands.

Each one of the roof lugs 11 serves to support the front sides of the pair of cylinders directly beneath it from beneath which the supporting spacer has been removed, and by means of a temporary connecting device, which in the case illustrated is constituted by one of the tie-rods 7. The lower nuts 8 are first unscrewed from the lower end of the rod and a special clevis nut 16 is screwed onto its upper end in place of the nuts 10, the tie-rod is then moved and the nut itself pinned to the roof lug directly above. A nut is then applied to the lower threaded end of the rod as thus raised and is screwed upwardly thereon against the cylinder lugs 9 until the rod takes the weight of the cylinders. This nut which is marked 8ª in Fig. 2 and which may be one of the nuts 8 or 10, thus serves as a take-up for the tension member or tie-rod, although the clevis nut 16 can also constitute a take-up when it is possible to screw farther into it. After one tie-rod has thus been utilized as a suspension device, the next adjacent tie-rod is similarly withdrawn and when its frame section 4 has been removed, it is likewise used as a suspension device and so on with the other tie-rods until the front part of as many of the cylinders become thus suspended from the roof part of the vessel as may be required to remove the crank shaft or other part. In Fig. 1 the shaft is shown as in two sections marked 17 and 18 with intermediate coupling flanges 19 disconnected, and the front frame sections of the three aft cylinders are removed, leaving a clear opening for withdrawing the aft section 17, indicated in raised position. The trolley 15 is moved along its rail to the center of the section 17 and the latter is connected to the chain hoist by a rope or sling by means of which it is first rolled out on the floor of the gangway whence it may be carried on the trolley to a point beneath the hatch and eventually passed endwise through the latter. The new section may come in by the same path and be placed in its bearings on the engine frame by the reverse procedure, after which the frame sections are put back and the tie-rods restored to their original positions and tightened. While the tie-rods form a suitable temporary suspension as described above, it will be observed that other suspension members having take-up means could obviously be used to take the weight of the cylinders without allowing the latter to sag, which might break or permanently distort the framework in rear. Various other modifications and variations in the shape, form, relative arrangement and mode of operation of the details of my invention may also and obviously be resorted to within the scope of the invention set forth in the appended claim.

Claim.

In a combustion engine power plant, the combination of the cylinders and bed of a multicylinder engine and interposed side spacer sections, the construction and relation of which are such that the supporting spacer sections are removable by straight lateral movement, tie-rods normally connecting the cylinders with the bed and holding the spacer sections in place, said tie-rods being adapted to be drawn upwardly to permit removal of the spacer sections, and means for suspending the raised tie-rods and securing them to the cylinders and thereby supporting the cylinders at the side from which spacer sections are removed.

In testimony whereof, I have signed this specification.

MAX ROTTER.